United States Patent [19]
Pearson

[11] Patent Number: 5,363,713
[45] Date of Patent: Nov. 15, 1994

[54] QUIETED SERVOACTUATOR

[75] Inventor: James E. Pearson, Downers Grove, Ill.

[73] Assignee: Eaton Corporation, Cleveland, Ohio

[21] Appl. No.: 55,467

[22] Filed: Apr. 29, 1993

[51] Int. Cl.$^5$ .................................................. F16H 1/16
[52] U.S. Cl. ................................... 74/425; 74/DIG. 10
[58] Field of Search .............. 74/425, 89.14, DIG. 10, 74/421 A

[56] References Cited

U.S. PATENT DOCUMENTS

| | | | |
|---|---|---|---|
| 4,226,136 | 10/1980 | Porter et al. | 74/425 X |
| 4,616,164 | 10/1986 | Kenney et al. | 74/DIG. 10 X |
| 4,931,710 | 6/1990 | De Vara et al. | 318/663 |
| 5,062,611 | 11/1991 | Hatton | 251/129.11 |
| 5,255,891 | 10/1993 | Pearson et al. | 251/129.11 |

FOREIGN PATENT DOCUMENTS

| | | | |
|---|---|---|---|
| 2304881 | 8/1974 | Germany | 74/425 |
| 2-57756 | 2/1990 | Japan | 74/89.14 |

Primary Examiner—David W. Laub
Attorney, Agent, or Firm—Roger A. Johnston

[57] ABSTRACT

A quieted motorized servoactuator with a sub-fractional horsepower high rpm, low voltage motor driving a gear train with about 900:1 reduction overall. The motor shaft has a metal worm meshing with a first stage thermoplastic elastomeric material, preferably polyamide polyester, of a hardness not greater than 72 on the Shore "D" scale. The first stage gear has an integral pinion meshed with a second stage gear of harder thermoplastic material, preferably acetal. The second stage gear has an integral pinion meshed with an output sector gear formed of harder thermoplastic material preferably comprising polyamide filled one-third by volume with fine glass particles.

16 Claims, 1 Drawing Sheet

QUIETED SERVOACTUATOR

BACKGROUND OF THE INVENTION

The present invention relates to motorized servoactuators of the type employing a small, high rpm, low torque electric motor driving a train of gears to provide a low rpm, high torque output for connection to a mechanism for performing a mechanical function. Servoactuators of this type are commonly employed in automotive vehicles for controlling air valves or blend-air doors in automotive air conditioning systems; and may also be used in other applications such as heater coil water valves and valves used for control of engine coolant circulation during engine warm-up.

Heretofore, where it is desired to employ a small, high rpm, low torque motor operating on a low voltage supply such as a direct current supply operating at 12-14 volts, as typically employed in a passenger motor vehicle, problems have been encountered with noise in the gear train, due to the high rpm of the motor shaft input gear. In particular, the relatively high frequency vibration of the input stage gear causes resonance in the gear casing or housing of the servoactuator which has been transmitted to the surrounding vehicle structure, producing a noticeable and objectionable sound which is audible in the passenger compartment.

It has thus been desired to provide a motorized servoactuator capable of operating on a relatively low voltage direct current supply, and which provides a low rpm, relatively high torque output and which is quiet in the sense of being free from any audibly objectionable whine or gear noise which would be noticeably objectionable to a passenger in a vehicle.

SUMMARY OF THE INVENTION

The present invention provides a servoactuator capable of operating on a 12-14 volt vehicle direct current power supply, and which employs a relatively high rpm, low torque motor connected to drive a gear train with a numerically relatively high reduction to provide a low rpm, relatively high torque output to a shaft for performing a mechanical function. The servoactuator employs a subfractional horsepower motor capable of rotating at 3000 rpm with a low torque output. The motor shaft has a metal worm which engages a first-stage spur gear formed of resilient polyester elastomer material. The first stage gear provides a substantial speed reduction from the worm of about 30:1 and has an integral output pinion engaging a second stage gear. The second stage spur gear is formed of substantially harder plastic material and has formed integrally therewith a second stage output pinion. The second stage gear is preferably formed of acetal thermoplastic material; and, the second stage output spur pinion engages an output gear. The output gear is preferably formed of plastic harder than the second stage gear, and preferably polyamide partially filled with fine glass particles. The servoactuator provides an overall speed reduction of 900:1 and produces a relatively high output torque at substantially reduced speed from a subfractional high rpm, low voltage motor with a low volume configuration, yet operates quietly with a relatively very low level of noise which is substantially audibly imperceptible.

DETAILED DESCRIPTION

Figure 1:
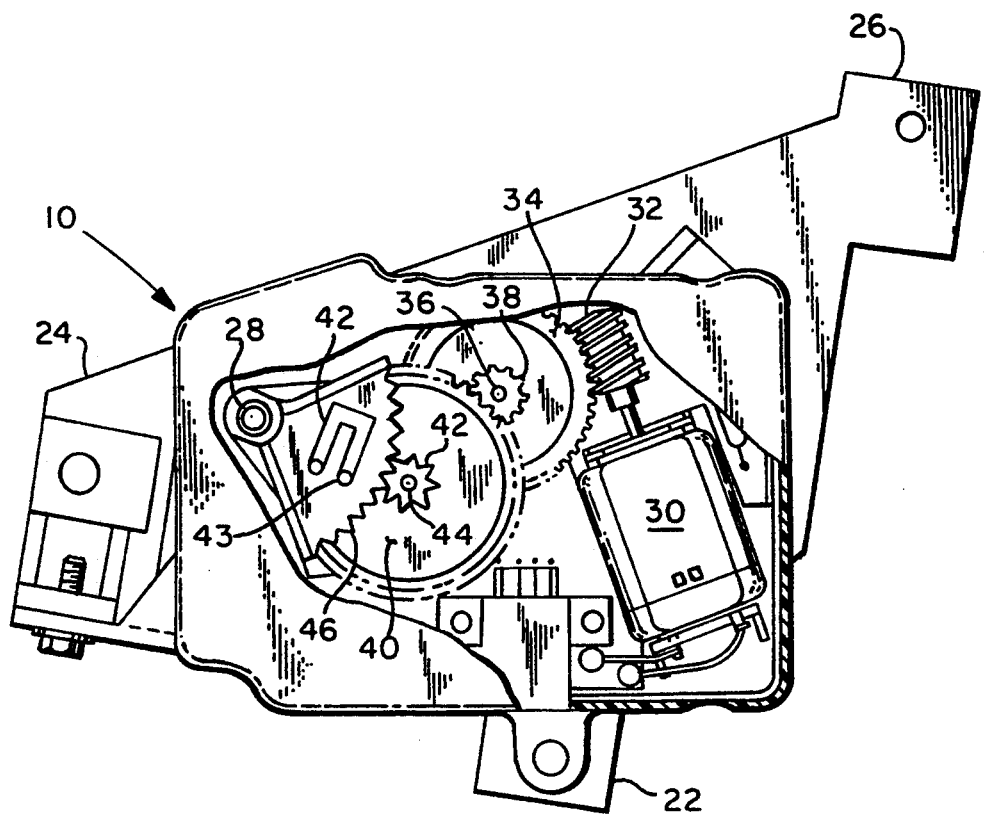
FIG. 1 is a top or plan view of the servoactuator assembly of the present invention, with portions of the casing broken away to expose the interior; and, FIG. 2 is a front elevational view of the servoactuator of FIG. 1.
Figure 2:
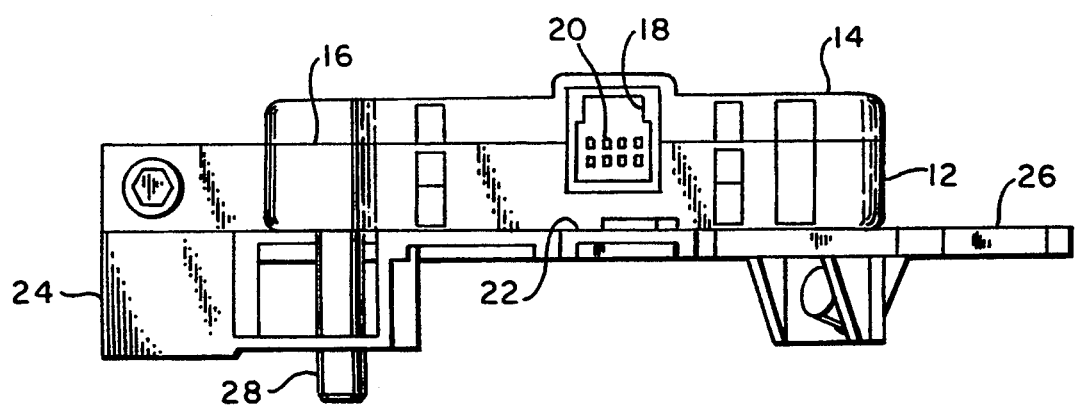

Referring to FIG. 1, the servoactuator assembly of the present invention is indicated generally at 10 and has lower housing shell portion 12 with an upper housing shell or cover 14 secured thereto along a parting line 16 by any suitable expedient as, for example, snap-locking tabs (not shown) or mechanical fasteners (not shown). An electrical receptacle 18 is formed in the housing shells, and has a plurality of connector terminal pins 20 connected thereto. The lower housing shell has provided thereon mounting flanges 22,24,26 for mounting the servoactuator to a mechanism to be driven by the output shaft denoted 28.

A motor 30 is received in the housing and has provided on its output shaft a metal worm 32, which in the presently preferred practice is formed of brass material. The motor 30 is of the subfractional horsepower type, and turns at about 3000 rpm at no load speed when operated on direct current at 12 volts.

Motor worm 32 is meshed with a first stage gear 34 which is journalled on the housing to rotate about axle or pin 36, and gear 34 has integrally formed therewith a first stage gear pinion 38. In the embodiment of FIG. 1, the reduction ratio between the worm and first stage gear is 30:1. In the present practice of the invention, the first stage gear 34 and spur gears as shown in FIG. 1 and are formed of thermoplastic polyester elastomer having a hardness not greater than 72 on the Shore "D" scale, and with a hardness preferably in the range 55-72 on the Shore "D" scale. In the present practice is has been found satisfactory to use a material sold under the trade name HYTREL ® obtainable from E.I. DuPont De Nemoirs & Co., of Wilmington, Del.; however, other materials with similar elastomeric properties may be used.

First stage output pinion 38 is meshed with a second stage gear 40 having a second stage output pinion 42 formed integrally therewith; and, gear 40 and pinion 42 are journalled about an axle or pin 44 provided on the housing. In the embodiment of FIG. 1, the reduction ratio between the first stage pinion 38 and second stage gear 40 is 5.5. In the presently preferred practice, gear 40 and are spur gears as shown in FIG. 1 and are formed of thermoplastic material substantially harder than the elastomeric material of the gear 34 such as an acetal thermoplastic per ASTM D4181 POM112 having a minimum hardness of 120 on the Rockwell "R" side.

In the present practice, one material found satisfactory is material sold under the trade name DELRIN ®, obtainable from DuPont; however, other thermoplastic materials with similar properties may be used. The metal worm gives a relatively long service life and the elastomer first stage gears absorbs the noise of the high speed worm.

It will be understood that the second stage gear pinion 42 is meshed with an output sector gear 46 drivingly connected to output shaft 28, which is suitably journalled about an axle pin 44 mounted on the housing. The output sector gear has provided thereon wiper contacts 42,43, which are electrically interconnected to operate as a movable shorting bar stationary on a resistive contact strip (not shown) to provide an output position signal, as is well known in the art. In the embodiment of FIG. 1, the reduction ratio between second stage pinion 42 and output sector gear 46 is also 5.5. In the present practice of the invention, output gear 46 is a spur gear as shown in FIG. 1 and is formed of polyamide material approximately one-third filled by volume with finely dispersed glass particles. It has been found satisfactory to employ group 6, grade 6 heat stabilized polyamide or nylon material per ASTM 4000 with the glass fill, and has a minimum hardness of 118 on the Rockwell "R" scale.

In the present practice of the invention, the servoactuator has an overall gear reduction ratio of about 900:1 from the motor worm to the output sector gear.

The servoactuator of the present invention thus employs a metal worm on a high speed motor shaft meshing with the softer elastomeric material which in turn meshes with a second stage gear of hard plastic material which has an output pinion in turn meshed with a partially glass filled plastic which is even harder material than that of the second stage gear.

The servoactuator of the present invention provides quieted operation for a servoactuator having motor shaft speed on the order of 3000 rpm, with an overall 900:1 gear reduction to the output shaft.

Although the present invention has been described with respect to the embodiments described and illustrated herein, it will be understood that the invention is capable of modification and variation, and is limited only by the following claims.

We claim:

1. A quieted motorized servoactuator comprising:
   (a) housing means having a motor therein with a shaft having a metal worm thereon;
   (b) a first stage gear driven by said metal worm, said first stage spur gear formed of resilient elastomeric material having a hardness not greater than 72 on the Shore "D" scale and having an output pinion formed integrally therewith; and,
   (c) a second stage spur gear meshing with said first stage pinion and formed of rigid plastic having a hardness greater than said elastomeric first stage gear; said second stage gear having an output pinion formed integrally thereon.

2. The servomotor defined in claim 1, wherein said first pinion gear is formed of polyester elastomeric material.

3. The servomotor defined in claim 1, further comprising a third stage gear meshing with said second stage gear output pinion and formed of plastic material having a hardness significantly greater than that of said second stage gear.

4. The servomotor defined in claim 1, wherein said metal worm is formed of brass material.

5. A quieted servomotor comprising:
   (a) housing means having a motor therein with a shaft having a metal drive worm thereon;
   (b) a first stage spur gear journalled for rotation on said housing means and meshing with said worm, said first stage gear including an output pinion, said first stage gear and pinion formed integrally of elastomeric material having a hardness not greater than 72 measured on the Shore "D" scale; and,
   (c) a second stage spur gear including an output pinion journalled for rotation on said housing means and formed of thermoplastic material having a hardness substantially greater than the hardness of said first stage gear and pinion;
   (d) an output spur gear meshing with said second stage pinion and journalled for rotation on said housing means and formed of thermoplastic material having a hardness significantly greater than said second stage gear.

6. The servoactuator defined in claim 5, wherein said output gear is formed of polyamide plastic filled one-third by volume with particulate glass.

7. The servoactuator defined in claim 5, where said first stage gear and pinion has a hardness in the range 55-72 measured on the shore "D" scale.

8. The servoactuator defined in claim 5, where said first stage gear and pinion has a hardness in the range 55-72 measured on the shore "D" scale.

9. The servoactuator defined in claim 5, wherein said second stage gear and said output pinion is formed of acetal thermoplastic material.

10. The servoactuator defined in claim 5, wherein the overall ratio of said gears is about 900:1.

11. The servoactuator defined in claim 5, wherein said motor comprises a sub-fractional horsepower motor having a load shaft speed of about 2500 rpm with 12 volts direct current excitations.

12. The servoactuator defined in claim 5, wherein said second stage gear is formed of plastic material per ASTM D4181 POM112 with a minimum hardness of 120 on the Rockwell "R" scale.

13. The servoactuator defined in claim 5, wherein said output gear is formed of group 6, grade 6 heat stabilized polyamide material filled one-third by volume with finely dispersed glass particles per ASTM 4000.

14. A method of quieting a motorized servoactuator comprising:
   (a) providing a drive motor having a no load shaft speed of about 3000 rpm and providing a metal drive worm on the motor shaft;
   (b) meshing said metal worm with a first stage reduction gear formed of thermoplastic elastomeric material;
   (c) meshing said first stage reduction gear with a second stage reduction gear of significantly harder thermoplastic material than said first stage reduction gear; and,
   (d) meshing said second stage reduction gear with an output stage reduction gear formed of significantly harder thermoplastic material filled with glass material.

15. The method defined in claim 14, wherein said step of meshing said first stage reduction gear with said second stage reduction gear includes forming a first stage pinion integrally on said first stage reduction gear and meshing said first stage pinion with said second stage reduction gear.

16. The method defined in claim 14, wherein said step of meshing said second stage gear with said output gear includes forming a pinion on said second stage gear and meshing said pinion with said output gear.

* * * * *